US009535849B2

(12) United States Patent
Kegel et al.

(10) Patent No.: US 9,535,849 B2
(45) Date of Patent: *Jan. 3, 2017

(54) IOMMU USING TWO-LEVEL ADDRESS TRANSLATION FOR I/O AND COMPUTATION OFFLOAD DEVICES ON A PERIPHERAL INTERCONNECT

(75) Inventors: Andrew G. Kegel, Redmond, WA (US); Mark D. Hummel, Franklin, MA (US); Stephen D. Glaser, San Francisco, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 1201 days.

This patent is subject to a terminal disclaimer.

(21) Appl. No.: 12/508,890

(22) Filed: Jul. 24, 2009

(65) Prior Publication Data
US 2011/0022818 A1 Jan. 27, 2011

(51) Int. Cl.
| G06F 12/00 | (2006.01) |
| G06F 12/10 | (2016.01) |
| G06F 3/06 | (2006.01) |
| G06F 12/08 | (2016.01) |
(Continued)

(52) U.S. Cl.
CPC ....... *G06F 12/1081* (2013.01); *G06F 12/1009* (2013.01); *G06F 3/0601* (2013.01); *G06F 3/064* (2013.01); *G06F 3/067* (2013.01); *G06F 3/0631* (2013.01); *G06F 3/0683* (2013.01); *G06F 12/0292* (2013.01); *G06F 12/063* (2013.01);
(Continued)

(58) Field of Classification Search
CPC ...... G06F 3/0601; G06F 3/0631; G06F 3/064; G06F 3/067; G06F 3/0683; G06F 12/0292; G06F 12/063; G06F 12/0868; G06F 12/0882; G06F 12/0897; G06F 12/1009; G06F 12/1081
USPC ........ 711/205, 207, 209, 221; 709/226, 229; 710/26, 33, 105, 120, 310; 712/10, 13, 225, 712/247; 718/104, 105
See application file for complete search history.

(56) References Cited

U.S. PATENT DOCUMENTS

| 7,543,131 B2 | 6/2009 | Hummel et al. |
| 7,548,999 B2 | 6/2009 | Haertel et al. |
| 2004/0186946 A1* | 9/2004 | Lee .............................. 711/103 |

(Continued)

OTHER PUBLICATIONS

International Search Report in application No. PCT/US2010/0043168 mailed Nov. 5, 2010.
(Continued)

*Primary Examiner* — Reba I Elmore
(74) *Attorney, Agent, or Firm* — Meyertons, Hood, Kivlin, Kowert & Goetzel, P.C.; Erik A. Heter

(57) ABSTRACT

An IOMMU for controlling requests by an I/O device to a system memory of a computer system includes control logic and a cache memory. The control logic may translate an address received in a request from the I/O device. If the request includes a transaction layer protocol (TLP) packet with a process address space identifier (PASID) prefix, the control logic may perform a two-level guest translation. Accordingly, the control logic may access a set of guest page tables to translate the address received in the request. A pointer in a last guest page table points to a first table in a set of nested page tables. The control logic may use the pointer in a last guest page table to access the set of nested page tables to obtain a system physical address (SPA) that corresponds to a physical page in the system memory. The cache memory stores completed translations.

23 Claims, 7 Drawing Sheets

(51) Int. Cl.
*G06F 12/02* (2006.01)
*G06F 12/06* (2006.01)
(52) U.S. Cl.
CPC ....... *G06F 12/0868* (2013.01); *G06F 12/0882* (2013.01); *G06F 12/0897* (2013.01)

(56) References Cited

U.S. PATENT DOCUMENTS

| | | |
|---|---|---|
| 2006/0075146 A1 | 4/2006 | Schoinas et al. |
| 2006/0277348 A1 | 12/2006 | Wooten |
| 2007/0168643 A1* | 7/2007 | Hummel et al. ............. 711/207 |
| 2008/0114906 A1 | 5/2008 | Hummel et al. |
| 2008/0114916 A1 | 5/2008 | Hummel et al. |
| 2008/0120487 A1 | 5/2008 | Saripalli |
| 2008/0209130 A1 | 8/2008 | Kegel et al. |
| 2009/0037936 A1* | 2/2009 | Serebrin ............ G06F 12/0292 719/318 |
| 2009/0043985 A1* | 2/2009 | Tuuk .................. G06F 12/1036 711/205 |
| 2009/0187697 A1 | 7/2009 | Serebrin |
| 2009/0187729 A1* | 7/2009 | Serebrin et al. ............. 711/206 |
| 2010/0191889 A1* | 7/2010 | Serebrin ...................... 710/269 |
| 2012/0265963 A1* | 10/2012 | Agesen .............. G06F 12/1009 711/207 |

OTHER PUBLICATIONS

U.S. Appl. No. 12/508,882, filed Jul. 24, 2009; First Named Inventor: Andrew G. Kegel.
Office Action from Japanese Application No. 2012521868, issued Jul. 30, 2014, English and Japanese versions, pp. 1-4.

\* cited by examiner

IOMMU USING TWO-LEVEL ADDRESS TRANSLATION FOR I/O AND COMPUTATION OFFLOAD DEVICES ON A PERIPHERAL INTERCONNECT

BACKGROUND OF THE INVENTION

Field of the Invention

This invention is related to the field of computer systems and, more particularly, to memory management units for input/output (I/O) devices.

Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

In a virtualized system, many applications may run in a virtual memory while the I/O devices access physical memory. In some systems, a virtual machine manager may intercept and translate addresses that will be used by an I/O device. However, this approach may be cumbersome and instruction intensive causing the system performance to be degraded, or at least reducing any benefits obtained by using an I/O device such as a computational offload engine.

SUMMARY

Various embodiments of an IOMMU using two-level translations are disclosed. In one embodiment, an IOMMU for controlling requests by an I/O device to a system memory of a computer system includes control logic and a cache memory. The control logic may be configured to translate an address received in a request from the I/O device. If the request includes a transaction layer protocol (TLP) packet with a process address space identifier (PASID) prefix, the control logic is configured to perform a two-level guest translation. The presence of the PASID prefix in the request indicates that the received address is a guest virtual address (GVA). Accordingly, to perform the two-level guest translation, the control logic may be configured to access a set of guest page tables to translate the address received in the request. A pointer in a last guest page table points to a first table in a set of nested page tables. The control logic is configured to use the pointer in a last guest page table to access the set of nested page tables to obtain a system physical address (SPA) that corresponds to a physical page in the system memory. The cache memory may be configured to store completed translations which may be used for subsequent translations.

Figure 1:
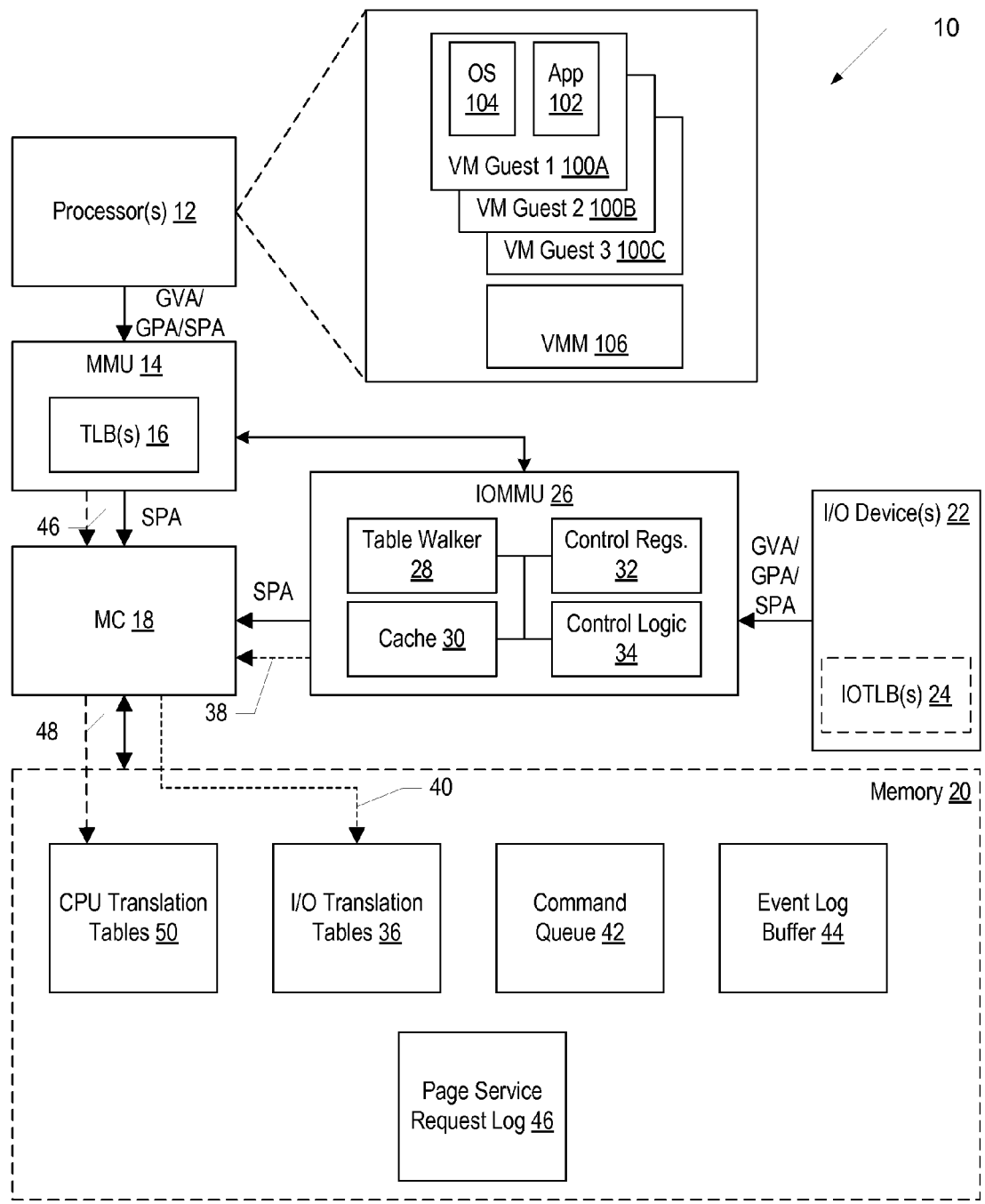
FIG. 1 is a block diagram of a high level view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram illustrating a simplified, high-level view of one embodiment of a computer system 10 is shown. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, a cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the CACHE 30, the control registers 32, and the control unit 34 are coupled together.

As described further below, the IOMMU 26 may include various features to simplify virtualization in the system 10. The description below will refer to a virtual machine monitor (VMM) that manages the virtual machines (scheduling their execution on the underlying hardware), controls access to various system resources, etc. It is noted that VMMs are also sometimes referred to as hypervisors. In the illustrated embodiment, processor(s) 12 is executing software in a virtualized environment. Accordingly, three virtual machines 100A, 100B, and 100C (e.g., VM guest 1-3) and a VMM 106 are shown. The number of virtual machines in a given embodiment may vary, and may dynamically change during use as virtual machines are started and stopped by a user. In the illustrated embodiment, the virtual machine 100A includes one or more guest applications 102 and a guest operating system (OS) 104. The OS 104 is referred to as a "guest" OS, since the OS 104 controls the virtual machine created for it by the VMM 106, rather than the physical hardware of the system 10. Similarly, the VM 100B and VM 100C may also each include one or more guest applications and a guest OS.

Generally, the applications in the virtual machines use a guest virtual address space and thus, guest virtual addresses (GVA). The guest OS in each virtual machine may manage mappings of the GVA to guest "physical" addresses (GPA) in the virtual machine. If the guest OS were running directly on the system 10 hardware, with no VMM, the physical addresses generated by the guest OS would indeed be the system physical addresses (SPA) of the memory locations in the system 10. However, in the virtual machine environment, the VMM 106 may manage the mappings from GPA to SPA. Thus, when processor 12 performs memory requests, the guest OS 104 may manage mappings of GVA to GPA (which may be further mapped to SPA by the VMM 106).

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14, but instead goes through the IOMMU 26. Accordingly, the MMU 14 may not provide memory management for the memory requests sourced from the I/O devices 22. Generally, memory management may comprise address translation from one type of virtual address (i.e., an address that may be used by software) to a physical address (i.e., an address that may be used by the memory controller) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). As described further below, in some embodiments that share the translation table information, when a particular page has been promoted such as when privileges change, a table re-walk may be necessary to update translation page tables that may now be unreliable. Other embodiments may not share translation tables between the IOMMU 26 and the MMU 14, as desired.

Generally, the I/O devices 22 may be configured to issue memory requests, such as memory read and write requests, to access memory locations in the memory 20 and in some cases, translation requests. The memory requests may be part of a direct memory access (DMA) read or write operation, for example. The DMA operations may be initiated by software executed by the processors 12, programming the I/O devices 22 directly or indirectly to perform the DMA operations. Depending on the address space in which the software executing on the processor is running, the I/O devices 22 may be provided with addresses corresponding to that address space to access the memory 20. For example, a guest application (e.g., App 102) executing on processor 12 may provide an I/O device 22 with GVAs, while a guest OS executing on processor 12 (e.g., OS 104) may provide GPAs to the I/O devices 22. In either case, when the I/O device 22 requests a memory access, the guest addresses may be translated by the IOMMU 26 to corresponding system physical addresses (SPA) to access the memory, and the system physical addresses may be provided to the memory controller 18 for access. That is, the IOMMU 26 may modify the memory requests sourced by the I/O devices 22 to change (i.e., translate) the received address in the request to an SPA, and the memory request may be forwarded to the memory controller 18 to access the memory 20.

In various embodiments, the IOMMU 26 may provide one-level, two-level, or no translations depending on the type of address it receives from the I/O device. More particularly, the IOMMU 26 may perform one-level nested translations or two-level guest translations. That is to say, the IOMMU 26 may provide both GPA to SPA translations (one-level), and GVA to SPA translations (two-level). Thus, as mentioned above a guest application may provide GVA addresses directly to an I/O device when requesting memory accesses, thereby making conventional VMM interception and translation unnecessary. This functionality may allow advanced computation architectures such as compute offload, user-level I/O, and accelerated I/O devices to be used more seamlessly in virtualized systems. It is noted that although one-level, two-level, or no translations are described, it is contemplated that in other embodiments, additional levels of address space may be used. In such embodiments, additional levels of translation (i.e., multi-level translations) may be performed by IOMMU 26 to accommodate the additional address spaces.

As described in greater detail below, the IOMMU 26 must have a way of recognizing what type of address it is receiving in a given request. Accordingly, in embodiments in which I/O devices are coupled to IOMMU 26 via standard peripheral buses such as PCI express (PCIe) interconnects, for example, a process address space identifier (PASID) may be sent to the IOMMU 26 using a transaction layer protocol (TLP) prefix.

The IOMMU 26 may use a number of data structures such as one or more sets of I/O translation tables 36 stored in the memory 20 to translate the addresses of memory and translation requests from the I/O devices 22. Generally, translation tables may be tables of translation data that can be used to translate addresses from one type to another. The translation tables may store the translation data in any fashion. For example, in one embodiment, the I/O translation tables 36 may include page tables similar to those defined in the x86 and AMD64™ instruction set architectures. Depending on the translation level, various subsets of the guest virtual address bits or guest physical address may be used to index levels of the tables, and each level may either be the end of translation (i.e. storing a real page number for the translation) or may point to another table (indexed by another set of address bits). The page may be the unit of translation (i.e. each address in the virtual page translates to the same physical page). Pages may have varying sizes, from 4 kilobytes up to Megabytes or even Gigabytes.

Additionally, the I/O translation tables 36 may include a device table (shown in FIG. 3) that maps I/O devices to sets of page tables (e.g., by device identifiers). The device identifier (ID) may be defined in a variety of ways, and may be dependent on the peripheral interconnect to which the device is attached. For example, Peripheral Component Interconnect (PCI) devices may form a device ID from the bus number, device number and function number (BDF). HyperTransport™ (HT) devices may use a bus number and unit ID to form a device ID. As described further below, the device table may include a plurality of entries indexed by the device ID, and each entry may include a pointer to a set of page tables used by the device having the corresponding device ID. In addition, in situations where an I/O device is assigned directly to a process or may run computations in the same address space as a user process, the process address space is identified and provided to the IOMMU 26 to enforce memory isolation protections. In some embodiments, the device table may further include a pointer to an interrupt remapping table (shown in FIG. 3) to remap the device's interrupts. Thus, in general, a translation from a GVA or a GPA to an SPA may be stored in one or more entries in one or more translation tables, and some of the entries may be shared with other translations. Traversing or "walking" the tables from entry to entry may be part of identifying the translation for the virtual address. In one embodiment, the translation tables 36 may include the interrupt remapping table mentioned above.

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU 26 may cache some translation data. For example, the cache 30 may be a form of cache similar to a TLB, which caches the result of previous translations, mapping guest virtual and guest physical page numbers to system physical page numbers and corresponding translation data. If a translation is not found in the cache 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of cache 30. Accordingly, the IOMMU 26 may include one or more memories to store translation data that is read from, or derived from, translation data stored in the memory 20.

The control logic 34 may be configured to access the cache 30 to detect a hit/miss of the translation for a given memory request, and may invoke the table walker 28. The control logic 34 may also be configured to modify the memory request from the I/O device with the translated address, and to forward the request upstream toward the memory controller 18. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26. The control logic 34 may also implement other features of the IOMMU 26.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI, PCIe, PCI-X, USB, firewire, SCSI (Small Computer Systems Interface), etc., sound cards, and a variety of data acquisition cards such as GPIB or field bus interface cards, etc. The term "peripheral device" may also be used to describe some I/O devices.

Figure 2:
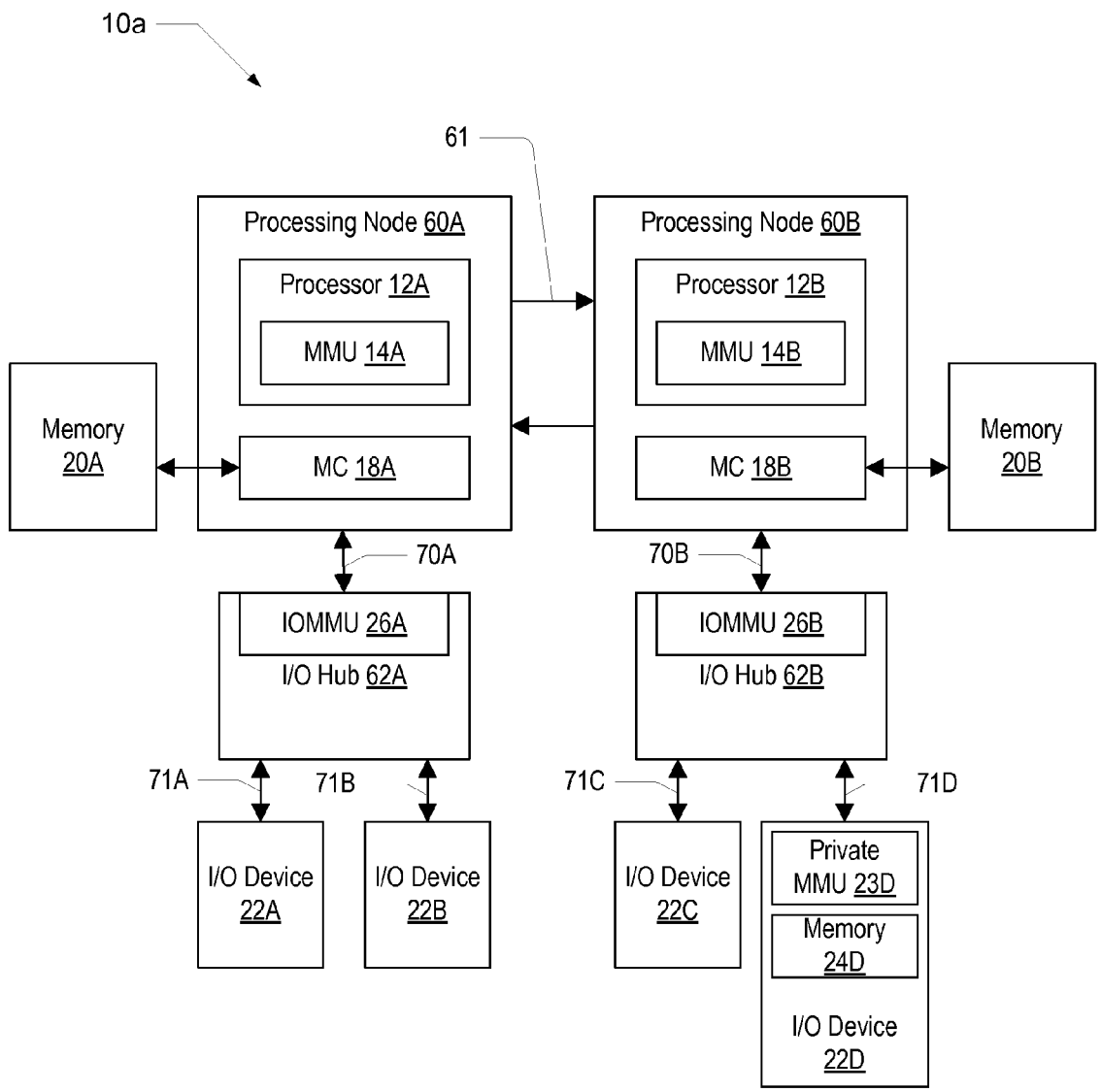
FIG. 2 is a block diagram of another embodiment of a computer system.

In some cases, one or more of the I/O devices 22 may comprise an IOTLB, such as IOTLBs 24 and/or an MMU (e.g., Private MMU 23D of FIG. 2). These IOTLBs may be referred to as "remote IOTLBs", since they are external to the IOMMU 26. In such cases, the addresses that have already been translated may be marked in some fashion so that the IOMMU 26 does not attempt to translate the memory request again. In one embodiment, the translated addresses may simply be marked as "pretranslated."

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

The system 10 illustrates high-level functionality of the system, and the actual physical implementation may take many forms. For example, the MMU 14 is commonly integrated into each processor 12. While a memory 20 is shown, the memory system may be a distributed memory system, in some embodiments, in which the memory address space is mapped to multiple, physically separate memories coupled to physically separate memory controllers. The IOMMU 26 may be placed anywhere along the path between I/O-sourced memory requests and the memory 20, and there may be more than one IOMMU. Still further, IOMMUs may be located at different points in different parts of the system.

FIG. 2 is one example of an embodiment of a system that uses HyperTransport™ (HT) coherent links 61 between processor nodes and HT I/O links (e.g., 70A and 70B) between processor nodes and I/O devices. More particularly, in one embodiment, the HT I/O links (e.g., 71A) may be used between I/O hubs and I/O devices that bridge to other peripheral interconnects. In addition, any other coherent interconnect may be used between processor nodes and/or any other I/O interconnect may be used between processor nodes and the I/O devices. For example, I/O links 71B, 71C and 71D may be PCIe links in various embodiments. Furthermore, another example may include processors coupled to a Northbridge, which is further coupled to memory and one or more I/O interconnects, in a traditional PC design.

Referring to the embodiment shown in FIG. 2, the system 10a comprises processing nodes 60A-60B, which respectively comprise processors 12A-12B further comprising MMUs 14A-14B. The processor nodes 60A-60B also comprise memory controllers 18A-18B. Each of processors 12A-12B may be an instance of a processor 12 as mentioned above. Similarly, each of MMUs 14A-14B and memory controllers 18A-18B may be instances of the MMU 14 and memory controller 18 shown in FIG. 1. In the illustrated embodiment, the MMU functionality is incorporated into the processor.

The system 10a includes a distributed memory system, comprising memories 20A-20B. The system physical address space may be distributed over the memories 20A-20B. Accordingly, a given memory request specifying a given address is routed to the memory controller 18A or 18B coupled to the memory 20A or 20B to which that given address is assigned.

Memory requests from the I/O devices (e.g. I/O devices 22A-22D, coupled to I/O Hubs 62A-62B as illustrated in FIG. 2) may not all take the same path to arrive at the memory controller 18A-18B that will service the request. For example, the I/O devices 22A-22B may transmit memory requests to the I/O hub 62A, which transmits the requests to the processing node 60A. If the address of a given memory request is assigned to the memory 20B, the processing node 60A may transmit the given memory request to the processing node 60B, so that the memory controller 18B may receive and process the request. The I/O devices 22C-22D may transmit memory requests to the I/O Hub 62B, which may transmit the requests to the processing node 60B. If the address of a given memory request is assigned to the memory 20A, the processing node 60B may transmit the given memory request to the processing node 60A.

The IOMMU may be placed anywhere along the path between I/O-sourced memory requests and the memory 20. In the illustrated embodiment, IOMMUs 26A-26B are included in the I/O hubs 62A-62B. Thus, any memory requests sourced by an I/O device coupled to the corresponding hub may be translated by the IOMMU in the I/O hub. Other embodiments may locate the IOMMU in different places, from IOTLBs in the I/O devices to IOMMUs within the processing nodes 60A-60B, or even IOMMUs at the memory controllers 18A-18B. Still further, IOMMUs may be located at different points in different parts of the system. For example, in some embodiments the I/O devices may be devices that may include local memory 24D as shown. Accordingly, I/O device 22D also includes a local/private MMU 23D.

Figure 3:
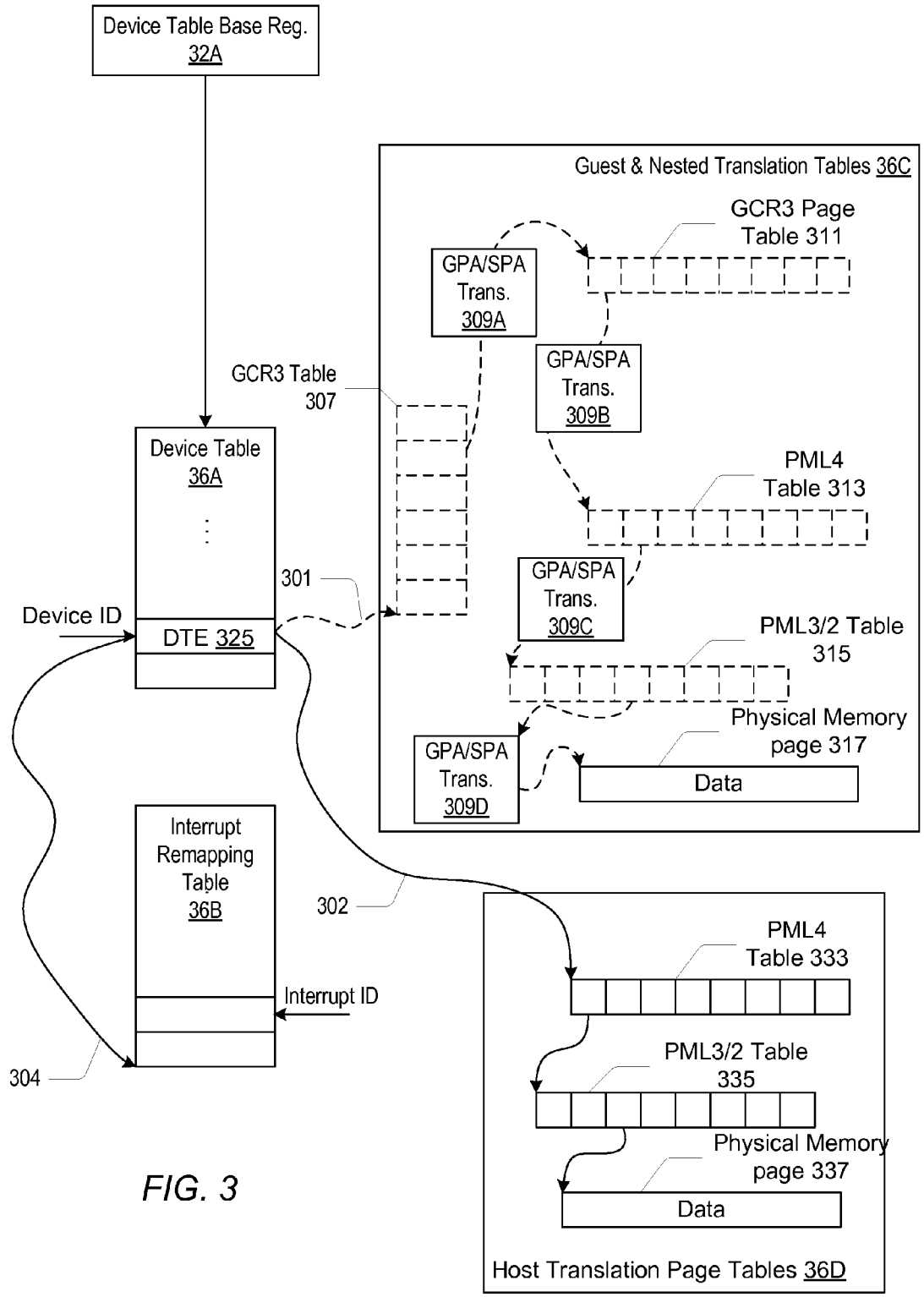
FIG. 3 is a diagram depicting one embodiment of a set of I/O translation tables of FIG. 1.

Turning to FIG. 3, a diagram illustrating one embodiment of the I/O translation tables 36 is shown. Specifically, the I/O translation tables 36 may include a device table 36A, an interrupt remapping table 36B, and two sets of I/O page tables (e.g., 36C and 36D). Also shown in FIG. 3 is one of the control registers 32 (control register 32A). The control register 32A may store a base address of the device table 36A.

Figure 4:
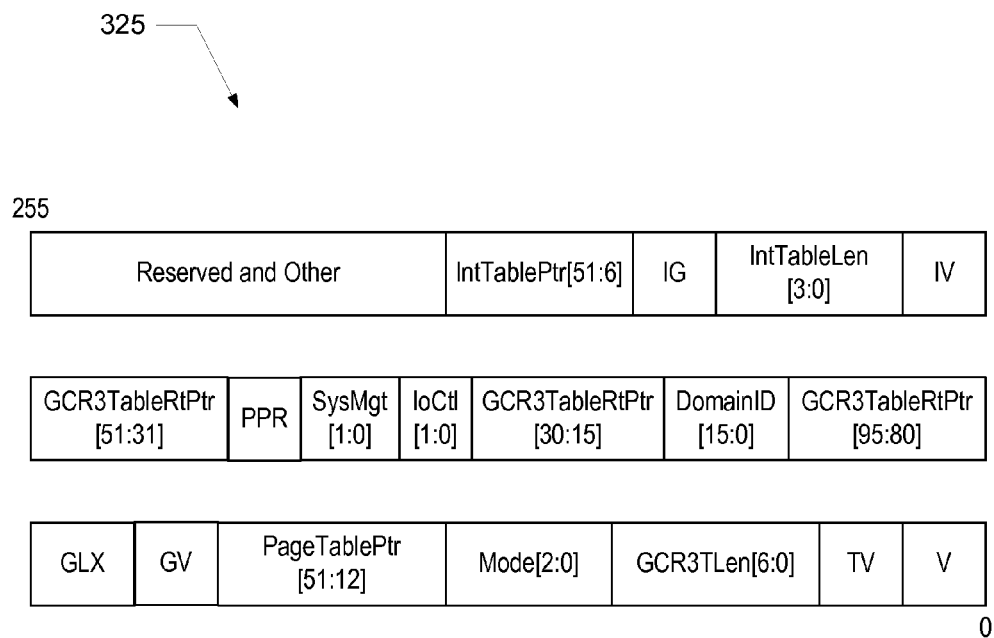
FIG. 4 is a diagram of one embodiment of a device table entry for a device table shown in FIG. 3.

The device table 36A includes a plurality of entries, indexed by a device ID assigned to the device. Thus, a given device corresponds to one of the entries in the device table 36A (unless the device has multiple device IDs, or unless the device has its traffic aggregated with others at a bridge device, and the traffic is transmitted under the bridge's device ID). The device table entry may include a variety of data. Portions of an exemplary device table entry 325 are shown in FIG. 4 and described in more detail below.

A given device table entry 325 may include a pointer (represented by arrows 301 and 302) to the I/O page tables 36C and 36D. The pointer to may point to a page table that is the starting point for translation searching in the I/O page tables 36C or 36D. As shown, the starting page table may include pointers to other page tables, in a hierarchical fashion, as mentioned above. As described further below, some tables may be indexed by a PASID, while other tables may be indexed using various bits of either the guest virtual address or the guest physical address to be translated, according to the implemented translation process.

The device table entry 325 may also include a pointer to the interrupt remapping table 36B (represented by arrow 304). The interrupt remapping data may be used when an interrupt request is transmitted by a device, and may be indexed by an interrupt ID. The interrupt ID may comprise data that identifies the requested interrupt, and may vary based on the mechanism used to transmit the interrupt request.

It is noted that, while one device table 36A is shown, multiple device tables may be maintained if desired. The device table base address in the control register 32A may be changed to point to other device tables. Furthermore, device tables may be hierarchical, if desired, similar to the page tables described above. Similarly, while one interrupt remapping table 36B is shown, there may be multiple interrupt mapping tables, e.g. up to one per entry in the device table 36A. There may also be multiple sets of page tables, e.g. up to one per entry in the device table 36A. It is noted that although independent of one another, other embodiments may implement I/O translation functionality without interrupt remapping functionality.

In the illustrated embodiment, the I/O translation tables 36C and 36D may support various combinations of one-level and two-level guest translations. As illustrated by the dotted lines, when a translation is a guest (i.e., two-level) translation (represented by dashed lines), the path beginning with arrow 301 is followed. However, when guest translations are not valid, then just the solid line path is followed beginning with arrow 302.

More particularly, when a memory access request or a translation request including a GVA is received from an I/O device, the device table entry corresponding to the device ID of the request is accessed. More particularly, by definition an I/O device that issues a GVA indicates that by including a PASID prefix, and an I/O device that issues a GPA indicates that by omitting the PASID prefix. As described in greater detail below in conjunction with the description of FIG. 5, an SPA pointer (e.g., 301) to the base address of a GCR3 table 307 is used, and the PASID may be used to index into the GCR3 table 307 to distinguish between one or more processes running on a given device. The entry within the GCR3 table 307 may include a GPA pointer to the base of the GCR3 page table 311. However, this GPA and all subsequent GPA pointers in the tables, may be translated to an SPA using translation logic and a set of page tables such as tables 333, and 335, for example, to access the next page table in memory. This translation mechanism is represented in FIG. 3 by the GPA/SPA Trans units 309A, 309B, 309C, and 309D. Some number of bits of the GVA of the request may be used to index into the GCR3 page table 311. In one embodiment, the corresponding entry in 311 may include a GPA pointer to the base of a page map level four (PML4) page table 313. The subsequent addresses in each of the nested page tables may also be GPAs that point to the base address of the next table, or in the case of the last table (e.g., 315) the entry may include a GPA pointer to the physical memory page. Each of these tables (e.g., 313, 315) may also be indexed by the GVA of the I/O request. The final translation (SPA) may be obtained by concatenating a portion of the GVA (e.g., the last several bits) and the SPA of the physical page in memory 317.

Thus, both guest and nested translation tables may be used in the two-level guest translation. However, if a GPA is provided by the I/O device, then a one-level translation may be performed by using the pointer 302 which provides the base address of the host translation page tables 36D. More particularly, the guest information in the device table entry is ignored, and other page table routing entry information (shown in FIG. 4) may be used to access the corresponding host translation page tables. In various levels of translation, different subsets of bits of the GPA may be used to index into each successive page table. Specifically, the pointer 302 may be an SPA pointer to the base of the PML4 page table 333. In contrast to the guest tables 36C, each pointer in the host page tables 36D may be an SPA which points to a base of the next table. The entry indexed by the GPA within PM4L page table 333 includes an SPA pointer to the base of PML3/2 page table 335. Depending on the actual page table level (i.e., 3 or 2), the pointer in the entry of table 335 may be an SPA pointer to the next table, or an SPA of the physical memory page 337. Accordingly, the final translation (SPA) may be obtained by concatenating a portion of the GPA (e.g., the last several bits) and the SPA of the physical page in memory 337.

To preserve memory isolation, in one embodiment, when accessing each subsequent page table, permissions may be checked, and if a there is a permission discrepancy or the page is not present, the IOMMU 26 may abort the translation and or lookup and internally issue a page fault and log the error. In other embodiments, at each stage, the IOMMU may simply accumulate any errors and at the end of the translation, discard the translation, issue a page fault and log the error, or some combination thereof.

Turning to FIG. 4, a diagram of one embodiment of an exemplary device table entry is shown. It is noted that the fields shown in the embodiment of FIG. 4 may be related to interrupt remapping and/or address translation, and other fields may be provided for other purposes in various embodiments. In the illustrated embodiment, the device table entry 325 is a 256-bit entry. However, other embodiments may implement supersets of the fields and other fields, subsets of the fields, or subsets in combination with other fields. Consequently the device table entry 325 may be any number of bits, as desired. A field may comprise one or more bits, the encoding of which are assigned particular meanings when interpreted by the IOMMU 26. If a field is a single bit, for this embodiment, it may be referred to as a bit. However, multi-bit fields for similar purposes may be used in other embodiments. Multi-bit fields are shown with bit ranges in FIG. 4, for this embodiment.

Various specific interrupt control bits may be provided in the Reserved and Other field to control whether certain specific interrupts are blocked or passed unmodified. Support for the guest advanced programmable interrupt controller (GAPIC) is provided by the GAPICTableRtPtr field, which includes an SPA of the base address of the GAPIC table for the device. The interrupt table pointer field (IntTablePtr) may store the base address of an interrupt remapping table mentioned above. The interrupt table length (IntTableLen) specifies the extent of the interrupt table. The interrupt table length field may be encoded for several possible lengths (e.g. 1-2048 entries in powers of two, for one embodiment). The IG bit may be used to indicate whether or not event log entries in the event log buffer 44 are to be created if an I/O page fault is detected for an interrupt message. The interrupt valid (IV) bit may indicate whether or not the interrupt-related fields are valid. If the fields are not valid, the IOMMU 26 may pass all interrupts unmodified.

The guest CR3 (GCR3) table root pointer (GCR3TableRtPtr) fields may include the SPA of the guest CR3 table for the I/O device. The peripheral page service request (PPR) bit indicates whether a peripheral may issue peripheral page service request that the IOMMU converts to peripheral page service request log entries or whether the request is handled as an error. It is noted that although the GCR3TableRtPtr is broken up into multiple fields in the illustrated embodiment, in other embodiments, the GCR3TableRtPtr may be one contiguous field, or broken up differently as desired.

The SysMgt field may be encoded to provide further control of communications in the system management range. Specifically, in one embodiment, the SysMgt field may be encoded to: block requests in the range; forward requests in the range unmodified (posted writes only); forward requests that map to INTx messages unmodified (posted writes only); or translate requests using the I/O page tables. The IoCtl field may be encoded to provide further control of communications in the I/O space range. Specifically, in one embodiment, the IoCtl field may be encoded to: block requests in the range; forward the requests unmodified; or translate the requests using the I/O page tables. However, in one embodiment, some of these fields (e.g., SysMgt, IoCtl) are relevant only to GPA-SPA translations but not applied to GVA-SPA translations The Domain ID is used to tag cache 30 entries and any other cache entries in the IOMMU 26 so that different devices differentiate their translation data. If devices share translation tables, they may have the same Domain ID to share cache entries. The Domain ID is completely under the control of software, and thus may permit flexibility for controlling software (e.g. a virtual machine monitor, or an operating system in non-virtual machine implementations) to group I/O devices into a domain to share translation data, or to separate the devices. For example, devices assigned to a given virtual machine may have the same Domain ID, and different Domain IDs may be used for different virtual machines. Any combination of separated devices and grouped devices may thus be created.

In one embodiment, the guest CR3 level (GLX) bit specifies the type of GCR3 lookup (i.e., one-level or two-level GCR3 tables) will be performed by the IOMMU. The guest translation valid (GV) bit determines whether two-level (i.e., nested and guest level) translation or one-level (e.g., host) translation will be performed. In one embodiment, when the GV bit is clear, the GLX bit and GCR3TableRtPtr fields are ignored.

The page table pointer (PageTablePtr) is the pointer to the host translation page tables 36D. This pointer may be used when I/O devices provide a GPA. The mode field (Mode) may be coded to indicate the depth of the device's I/O page tables and whether translation is disabled entirely. For example, for devices providing an SPA and which mark the requests as pre-translated, the corresponding device entry may have this field encoded to disable translations. Other encodings may indicate the level in the page table hierarchy at which translation is to begin for requests mapped to this entry. The TV bit indicates whether or not the page translation data are valid, and the V bit indicates if the entry 80 is valid.

Figure 5:
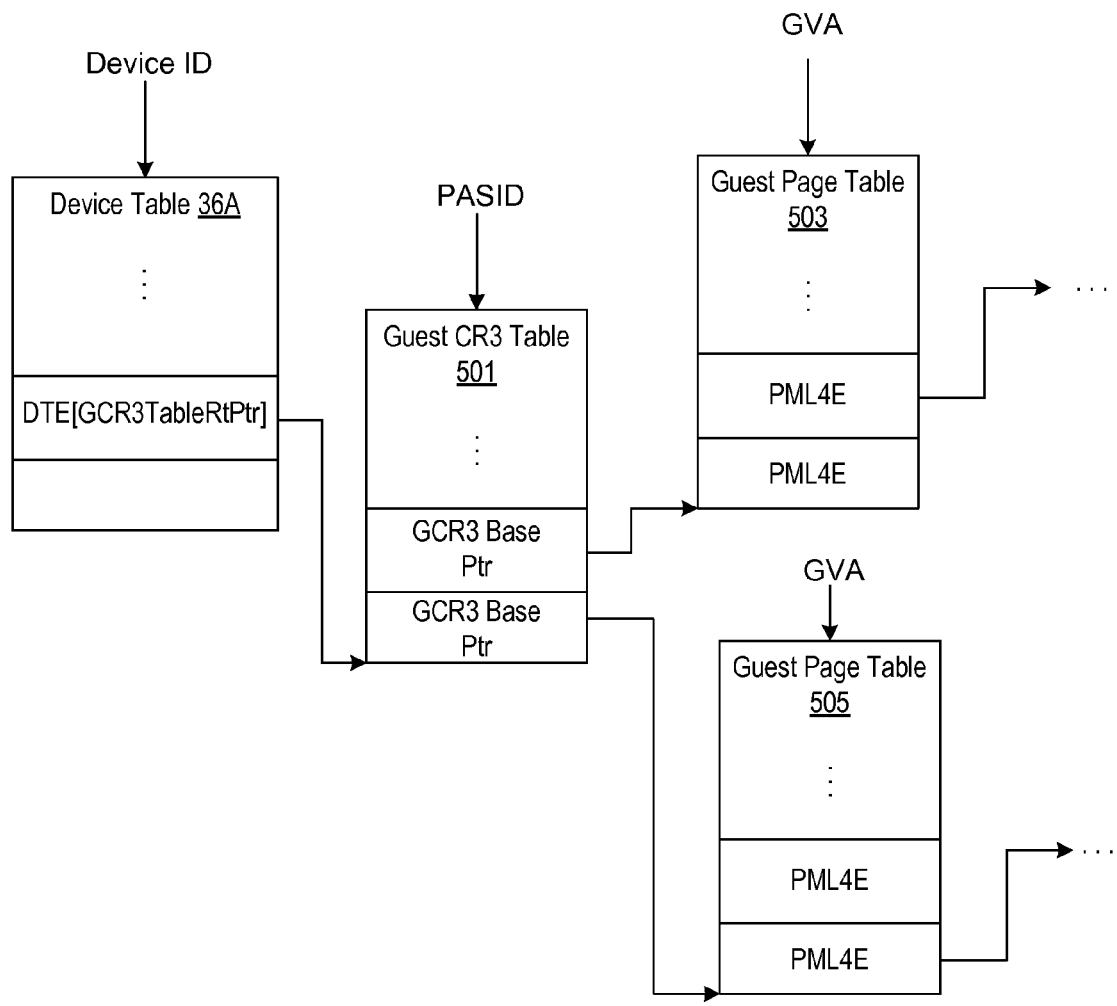
FIG. 5 is a diagram depicting more detailed aspects of the guest virtual address translation mechanism.
Figure 7:
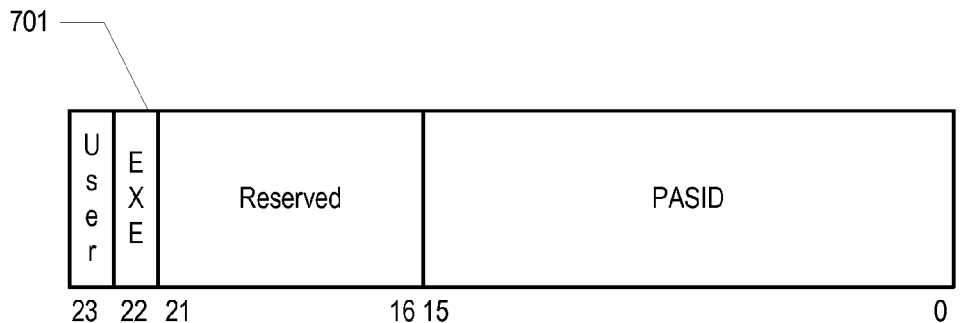
FIG. 7 is a diagram of one embodiment of a process address space identifier (PASID) prefix.

Referring to FIG. 5, a diagram depicting more detailed aspects of the guest virtual address translation mechanism is shown. As described above, the device table 36A may include a number of entries (DTE), each including a GCR3TableRtPtr field. If the guest translation is valid for that entry, the field will include an SPA pointer to the guest CR3 table 501 in memory. As shown, the GCR3 table 501 may be indexed by the PASID value associated with the device's request. As mentioned above, the device PASID may be obtained in a variety of ways dependent upon the type of I/O interconnect that is used. In FIG. 7, one embodiment of a PASID prefix is shown. This PASID prefix may be used in a variety of standard bus architectures that use a prefix. In FIG. 8, a TLP PASID prefix for the PCIe interconnect is shown. Accordingly, the PASID prefix of FIG. 7 may be used in the embodiment of FIG. 8 to identify the process within a given device.

As shown, the GCR3 table 501 has two entries, each including a GCR3 base pointer, which as described above, may be a GPA pointer to guest page tables 503 and 505. In the illustrated embodiment, guest page tables 503 and 505 may be indexed by the GVA of the I/O request. Further, each valid entry in the guest page tables 503 and 505 may include a GPA pointer to the base address of a respective page map level four table.

In one embodiment, the GCR3 table 501 must be contiguous in memory. Thus in systems having a large number of PASIDs, the memory management may get cumbersome. Accordingly, in an alternative embodiment, the GCR3 tables may be implemented in a hierarchical manner. For example, one or more $2^{nd}$ level GCR3 tables (not shown) may be used. In such an embodiment, the $1^{st}$ level GCR3 table may be a GCR3 base table and be indexed using a first subset of the PASID bits. A given entry in the $1^{st}$ level GCR3 table may include a GPA pointer to a respective $2^{nd}$ level GCR3 table. The $2^{nd}$ level GCR3 tables may be indexed using a second subset of the PASID. Each entry of the $2^{nd}$ level GCR3 tables may include a GPA pointer to a guest page table such as table 503 or 505. Thus the choice of whether to implement one or two-level GCR3 tables may be dependent upon the number of PASIDs in use. It is noted that in various embodiments, the subsets of PASID bits may be non-overlapping or they may be overlapping, as desired.

Figure 6:
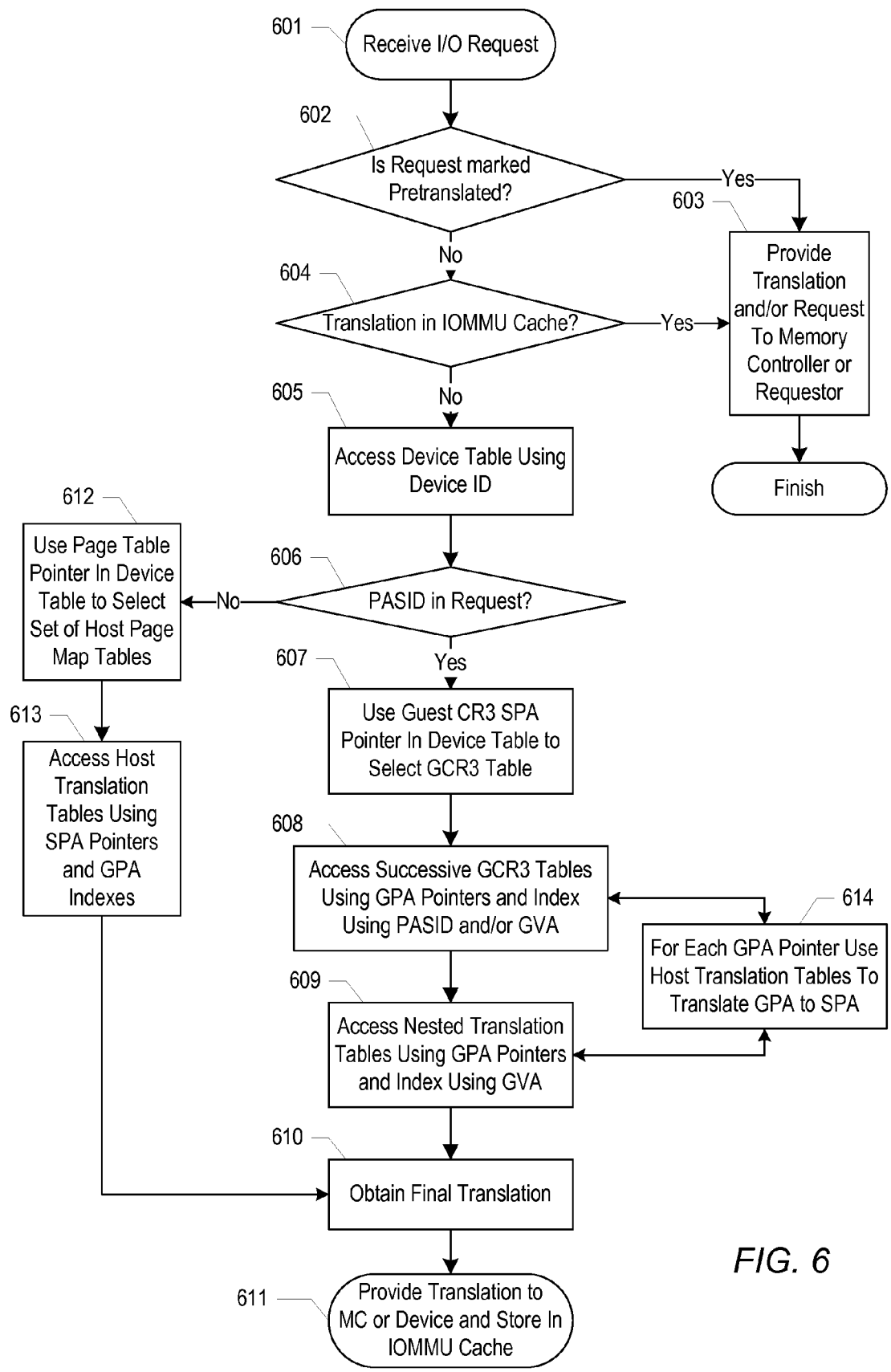
FIG. 6 is a flow diagram describing the operation of the embodiments of the computer system shown in FIG. 1 through FIG. 5.

Turning to FIG. 6, a flow diagram describing operational aspects of the embodiments of the system shown in FIG. 1 through FIG. 5 is shown. Referring collectively to FIG. 1-FIG. 6 and beginning in block 601 of FIG. 6, an I/O request is received by IOMMU 26. For example, the request may be an I/O memory access request such as a DMA access, for example, on behalf of one of the VM applications (e.g., 102). Alternatively, the request may be a translation request such as an ATS, for example, by an I/O device with a remote IOTLB, for example. If the request is not a memory request, operation may proceed as shown in block 604. However, if the request is a memory request, IOMMU 26 may determine if the request is marked as pre-translated (block 602), as in the case of an I/O device having an onboard MMU, for example. In that case the address may be an SPA, and not need any translation. If the request is marked pre-translated, IOMMU 26 may provide the request to the memory controller 18 (block 603).

Referring back to block 602, if the request is not marked as pre-translated or if the request is a translation request, IOMMU 26 may do a lookup within cache 30 for the translation (block 604). If the translation is present, the IOMMU 26 may provide the translation back to the requester, or provide the translation along with the request to the memory controller 18 (block 603).

However, if the translation is not present in the cache 30 (block 604), table walker 28 in conjunction with control logic 34 may access the I/O translation tables 36. More particularly, table walker 34 may access the device table base register 32A to obtain the device table base address in memory 20. Table walker 28 may use the device ID to index into the device table 36A (block 605). If the request includes a PASID value (block 606), the table walker 28 may perform a two-level guest translation. More particularly, in one embodiment, if the I/O request includes a TLP PASID prefix, then the address associated with the request is a GVA. Thus, two-level translation is performed. The table walker 28 may use the GCR3 control bits and the GCR3 TableRtPtr address in the device table entry to find the GCR3 tables in memory (block 607).

As described above, the GCR3 TableRtPtr address may be an SPA, in one embodiment. The table walker 28 may use the GPA pointers to locate the corresponding GCR3 and guest tables and the PASID to index the GCR3 tables. As shown in block 614, and described above, each GPA pointer may be translated by the IOMMU 26 using, for example, the host translation page tables 36D. Some subset of the GVA bits of the request may be used to index the guest page table(s). The last guest page table may include a GPA pointer to the base address of the host page map level four tables. As each successive guest table is accessed the permissions are checked, and any failed permissions may generate a page fault or other errors, in one embodiment (block 608).

The table walker 28 may then successively find the host translation tables 36D using the GPA pointers within each entry of each preceding table. At various levels of the page tables, different subsets of the GVA bits of the request may be used to index into each host translation page table. As described above, once the last page table is accessed, the corresponding entry may contain the GPA of the physical page in memory. The table walker 28 may translate that GPA into an SPA (block 609). The table walker 28 may then concatenate the SPA of the physical memory page with the last few bits of the GVA to obtain the final translation address (block 610). The table walker 28 may provide the translation address to the memory controller 18 along with the request, if the request is a memory request. Alternatively, the table walker may provide the translation to the requesting I/O device if the request was a translation request. The table walker 28 may also store the translation within the cache 30 for use in future translation lookups (block 611).

Referring back to block 606, if the request does not include a PASID, then the address in the request is a GPA. In this case, the table walker 28 may perform a one-level translation using the PageTableRtPtr address in the device table entry to find the host translation page tables 36D in memory (block 612). In a way similar to that described above, table walker 28 may use the SPA pointer to the base address of the host page map level four tables for the I/O device. However, in contrast to the guest translations, when performing one-level translations using the host translation page tables, each pointer to a next page table/memory physical page is an SPA. Thus, the table walker 28 may successively find the host translation tables using the SPA pointers within each entry of each preceding table. At each level of the host page tables, different subsets of the GPA bits of the request may be used to index into each host translation page table. As described above, once the last page table is accessed, the corresponding entry may contain the SPA of the physical page in memory (block 613). The table walker 28 may concatenate the SPA of the physical memory page with the last few bits of the GPA of the request to obtain the final translation address (block 610).

Turning to FIG. 7, a diagram of one embodiment of a PASID prefix payload is shown. As shown, the PASID prefix payload 701 includes 24 bits. In the illustrated embodiment, bits [15:0] are the guest process address space ID, bits [21:16] are reserved, bit 22 is the execute/no-execute permission, and bit 23 is a user/supervisor indication. It is noted that in other embodiments, the bit locations and definitions may be different. It is noted that in other embodiments, the bit locations and definitions may be different. It is also noted that in other embodiments, other bits may be used to indicate other attributes. For example, the bits may indicate cache coherency and special security attributes.

In one embodiment, the PASID bits in conjunction with the requester/device ID uniquely identifies the address space associated with a transaction. The execute/no-execute bit, when set may indicate that the indicated range of memory may include code that may be executed by the requesting function, and when clear the bit may indicate that there is no code that may be executed by the requesting function. The user/supervisor bit, when set, may indicate that the indicated memory range may contain information that is accessible by entities operating in user or supervisor mode. In contrast, a bit that is clear may indicate that the indicated memory range may contain information that is accessible by entities operating only in supervisor mode.

As mentioned above, many standard peripheral bus architectures allow for prefixes. Accordingly, the PASID prefix payload 701 may be used to convey the process identifier of the process by which the I/O device is being controlled. As described in greater detail below in conjunction with the descriptions of FIG. 8A and FIG. 8B, the peripheral bus/interconnect may be a PCIe interconnect. Accordingly, the PASID prefix 701 may be used in a PCIe transaction layer protocol packet structure.

Figure 8A:
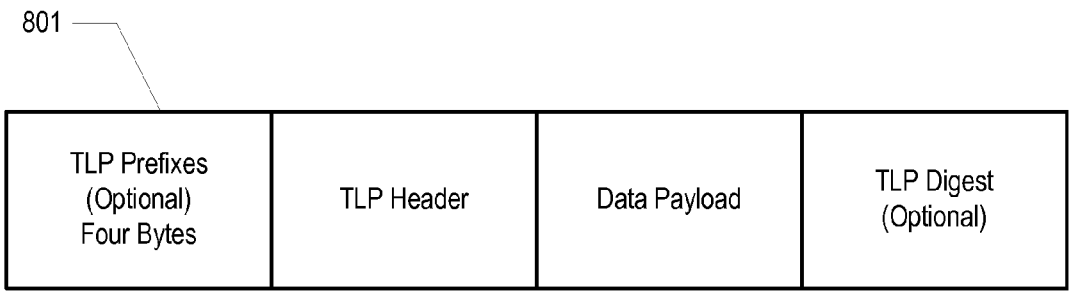
FIG. 8A is a diagram illustrating one embodiment of a transaction layer protocol (TLP) packet for use on a PCIe interconnect.

Referring to FIG. 8A, a diagram of one embodiment of an exemplary TLP packet according to the PCIe specification is shown. The PCIe uses a packet-based protocol to exchange information between the Transaction Layers of the two devices communicating with each other over a PCIe link. PCIe supports the following basic transaction types: Memory, I/O, Configuration, and Messages. Two addressing formats for Memory Requests are supported: 32 bit and 64 bit. Accordingly, as shown in FIG. 8A, the TLP packet 801 includes one or more optional TLP Prefixes, a TLP header, a data payload (for some types of packets), and an optional TLP digest. Detailed information regarding the definitions of the packet fields and bits may be found in the most recent version of the PCI Express Specification available from the PCI-SIG. However, a more detailed description of one particular embodiment of the TLP prefix is shown in FIG. 8B and described below.

Figure 8B:
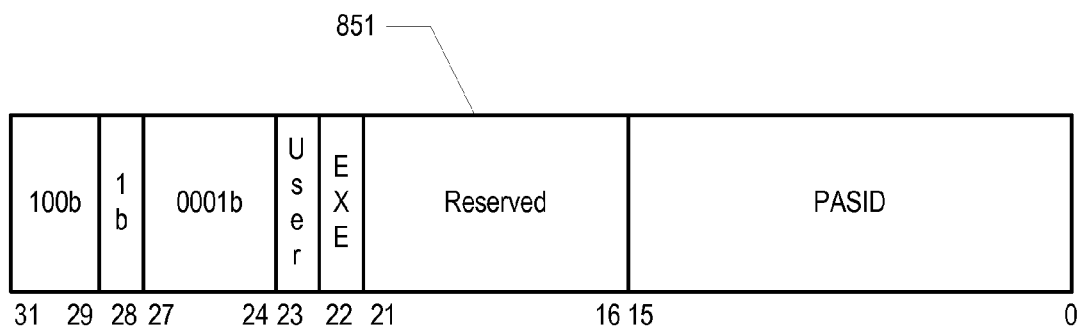
FIG. 8B is a diagram illustrating one embodiment of a TLP PASID prefix for use on PCIe interconnect.

Referring to FIG. 8B, a diagram of one embodiment of a TLP PASID prefix according to the PCIe specification is shown. Similar to the prefix shown in FIG. 7, the TLP prefix 851 includes a 16-bit PASID field as described above, a 6-bit reserved field, an exe bit as described above, a user bit as described above, a 4-bit type field, a 1-bit field indicating the prefix is end-to-end, and a format field. As shown, the format field may be encoded with a 100 b encoding to indicate that the TLP prefix is a TLP prefix. The type field may be encoded to indicate that the prefix is a PASID prefix. It is noted that in other embodiments, the TLP prefix may include other fields and other numbers of bits in the fields.

As mentioned above, in one embodiment, an ATS (i.e., translation) request or memory reference that results in insufficient guest privileges drawn from a cache 30 entry may be based on stale information. When the IOMMU 26 detects an access violation using cached guest translation information, it must rewalk the guest page tables to recompute access permission using fresh information read from memory, in the process replacing or discarding cached information. The nested page tables may be read as a consequence of the guest table rewalk. If the fetched information contains permission controls disallowing the access then the IOMMU 26 fails the access, else the IOMMU 26 may allow the requested access. An ATS translation request always returns the computed access privileges. The rewalk may require a full walk of both guest and nested translations.

It is noted that when translating addresses in embodiments implementing PCIe devices, the IOMMU 26 may need to convert between internal processor semantics and PCIe semantics. Various page tables include a present bit (P) and a read/write bit (R/W), ATS requests include a no-write hint, and ATS responses requires separate read (R) and write (W) permission bits. In one embodiment, the IOMMU 26 may provide an ATS response consistent with processor internal long page table semantics for privilege promotions. In general, the IOMMU 26 should return results based on the values found in the cache 30. The special case for an ATS request are for pages for which the system software may have elevated the access permissions without issuing an invalidation command to the IOMMU 26. In one embodiment, the system software is required to issue an invalidation command when it reduces access permissions (including marking the page not-present with P=0). Specifically, software must invalidate after removing write or execute permission, after changing P from present to not-present, or after changing U/S from user to supervisor.

It is noted that the above embodiments may be implemented in hardware, software, or a combination of both. In addition, various ones of the above hardware components may first be designed using software written in a hardware definition language. Accordingly, any of the instructions used to implement the above embodiments stored on various types of storage. Thus various embodiments may further include storing instructions and/or data implemented in accordance with the foregoing description upon a computer readable storage medium. Generally speaking, a computer readable storage medium may include storage media or memory media such as magnetic or optical media, e.g., disk, CD-ROM, DVD, volatile or non-volatile media such as RAM (e.g. SDRAM, DDR SDRAM, RDRAM, SRAM, etc.), ROM, and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An input/output (I/O) memory management unit (IOMMU) for controlling requests by an I/O device to a memory of a computer system, the IOMMU comprising:
control logic configured to translate an address received in a request from the I/O device, wherein in response to receiving in the request, a transaction layer protocol (TLP) packet including a process address space identifier (PASID) prefix, the control logic is configured to perform a two-level guest translation;
wherein the control logic is configured to access a set of guest page tables and a set of nested page tables to translate the address received in the request to obtain a system physical address (SPA) that corresponds to a physical page in the memory.

2. The IOMMU as recited in claim 1, wherein the set of guest page tables includes a device table having one or more entries, wherein each entry is configured to store a pointer to a first guest translation table of the set of guest tables, and wherein the pointer comprises an SPA, which corresponds to an address space mapped by a virtual memory monitor (VMM) executing in on a processor of the computer system.

3. The IOMMU as recited in claim 2, wherein the pointer to a first table in the set of nested page tables comprises a guest physical address (GPA) corresponding to an address space mapped by a guest operating system executing in a virtual machine (VM) on the processor.

4. The IOMMU as recited in claim 2, wherein the address received in the request comprises a guest virtual address (GVA), wherein a GVA corresponds to an address space mapped by a guest application executing in a virtual machine (VM) on the processor, wherein the control logic is configured to translate the GVA to an SPA using the two-level guest translation.

5. The IOMMU as recited in claim 2, wherein in response to receiving an I/O having no PASID prefix in the TLP packet, the control logic is configured to perform a one-level translation, wherein control logic is configured to access another pointer in the device table entry for the given request, wherein the another pointer comprises a pointer to a set of host translation page tables.

6. The IOMMU as recited in claim 5, wherein at least some of the host translation page tables include entries having an SPA pointer to a next successive host translation table.

7. The IOMMU as recited in claim 1, wherein the TLP packet comprises a packet having the prefix field, a header field, a data payload field, and an optional digest field, and wherein the TLP packet is conveyed from the I/O device to the IOMMU upon a peripheral component interconnect express (PCIe) link.

8. The IOMMU as recited in claim 1, wherein the control logic is further configured to concatenate a subset of bits of the address received in the I/O request with the SPA that corresponds to a physical page in the memory to provide a final translation address.

9. The IOMMU as recited in claim 1, further comprising a cache memory coupled to the control logic and configured to store completed translations.

10. The IOMMU as recited in claim 1, wherein a pointer in a last guest page table points to a first table in the set of nested page tables.

11. A system comprising:
a processor;
a system memory coupled to the processor and configured to store translation data;
a least one I/O device configured to generate a request for accessing the system memory; and
an I/O memory management unit (IOMMU) coupled to the I/O device and to the system memory, the IOMMU includes:
control logic configured to translate an address received in the request from the I/O device, wherein in response to receiving in the request, a transaction layer protocol (TLP) packet including a process address space identifier (PASID) prefix, the control logic is configured to perform a two-level guest translation;
wherein the control logic is configured to access a set of guest page tables and a set of nested page tables to translate the address received in the request to obtain a system physical address (SPA) that corresponds to a physical page in the memory.

12. The system as recited in claim 11, further comprising a cache memory coupled to the control logic and configured to store completed translations, wherein the control logic is configured to search the cache memory for a translation prior to performing any translations, and wherein in response to determining that a page level privilege has changed, the control logic is further configured to perform the translation obtain a final translation address.

13. The system as recited in claim 11, wherein the memory is mapped into a plurality of address spaces including the SPA corresponding to an address space mapped by a virtual memory monitor (VMM) executing in on the processor, a guest physical address (GPA) corresponding to an address space mapped by a guest operating system executing in a virtual machine (VM) on the processor, and a guest virtual address (GVA) corresponding to an address space mapped by a guest application executing in a virtual machine (VM) on the processor.

14. The system as recited in claim 13, wherein an I/O request including the GVA indicates the GVA by including the TLP PASID prefix, and an I/O request including the GPA indicates the GPA by omitting the TLP PASID prefix.

15. The system as recited in claim 11, wherein the address received in the request comprises a GVA, wherein the control logic is configured to translate the GVA to an SPA using the two-level guest translation.

16. The system as recited in claim 11, wherein the TLP packet comprises a packet having the prefix field, a header field, a data payload field, and an optional digest field, and wherein the TLP packet is conveyed from the I/O device to the IOMMU upon a peripheral component interconnect express (PCIe) link.

17. An input/output (I/O) memory management unit (IOMMU) for controlling requests by an I/O device to a memory of a computer system, the IOMMU comprising:
control logic configured to translate an address received in a request from the I/O device, wherein in response to receiving in the request, a transaction layer protocol (TLP) packet including a process address space identifier (PASID) prefix, the control logic is configured to perform a two-level guest translation using translation data stored within the memory;
wherein the translation data includes:
one or more device table entries in a device data structure; and
a first set of page data structures including a set of guest page data structures and a set of nested page data structures;
wherein the control logic is further configured to:
select a device data structure entry for a given request using a device identifier corresponding to the I/O device that generates the request;
use a pointer from the selected device data structure entry to access the set of guest translation data structures, and
use a pointer from a guest translation data structure to access the set of nested page data structures.

18. A method for controlling input/output I/O requests to a memory of a computer system using an input/output memory management unit (IOMMU), the method comprising:
storing translation data in the memory of a computer system, wherein the translation data includes a set of guest page tables and a set of nested page tables;
control logic translating an address received in a request from the I/O device, wherein in response to receiving in the request, a transaction layer protocol (TLP) packet including a process address space identifier (PASID) prefix, the control logic is configured to perform a two-level guest translation; and
the control logic accessing the set of guest page tables and the set of nested page tables to translate the address received in the request to obtain a system physical address (SPA) that corresponds to a physical page in the memory.

19. The method as recited in claim 18, wherein the TLP packet comprises a packet having the prefix field, a header field, a data payload field, and an optional digest field, and wherein the TLP packet is conveyed from the I/O device to the IOMMU upon a peripheral component interconnect express (PCIe) link.

20. The method as recited in claim 18, wherein the address received in the I/O request comprises a guest virtual address (GVA) corresponding to an address space mapped by a guest application executing in a virtual machine (VM) on a processor of the computer system.

21. The method as recited in claim 18, the control logic performing a one-level translation in response to receiving an I/O request that does not include a TLP packet with a TLP PASID prefix.

22. The method as recited in claim 21, wherein the address received in the I/O request that does not include the TLP packet with a TLP PASID prefix comprises a guest physical address (GPA) corresponding to an address space mapped by a guest operating system executing in a virtual machine (VM) on a processor of the computer system.

23. A computer readable storage medium comprising a data structure which is operated upon by a program executable on a computer system, the program operating on the data structure to perform a portion of a process to fabricate an integrated circuit including circuitry described by the data structure, the circuitry described in the data structure including:
control logic configured to translate an address received in a request from the I/O device, wherein in response to receiving in the request, a transaction layer protocol (TLP) packet including a process address space identifier (PASID) prefix, the control logic is configured to perform a two-level guest translation;
wherein the control logic is configured to access a set of guest page tables and a set of nested page tables to translate the address received in the request to obtain a system physical address (SPA) that corresponds to a physical page in the memory.

* * * * *